UNITED STATES PATENT OFFICE.

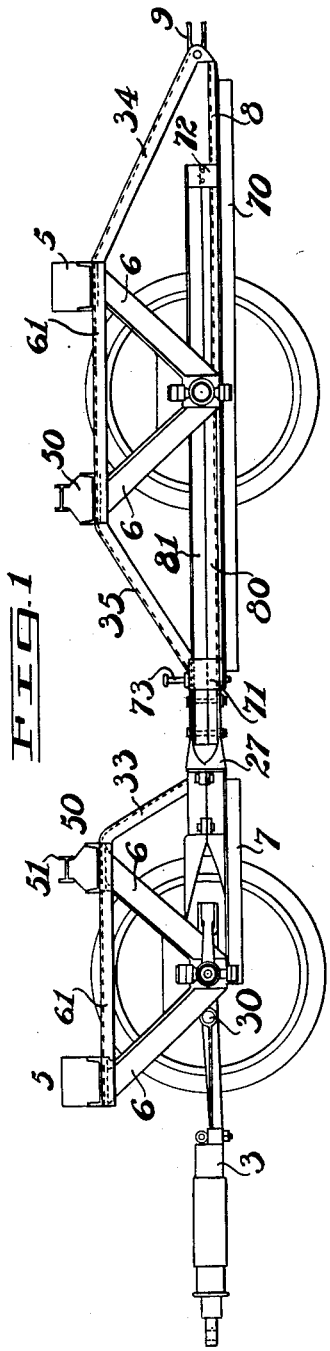

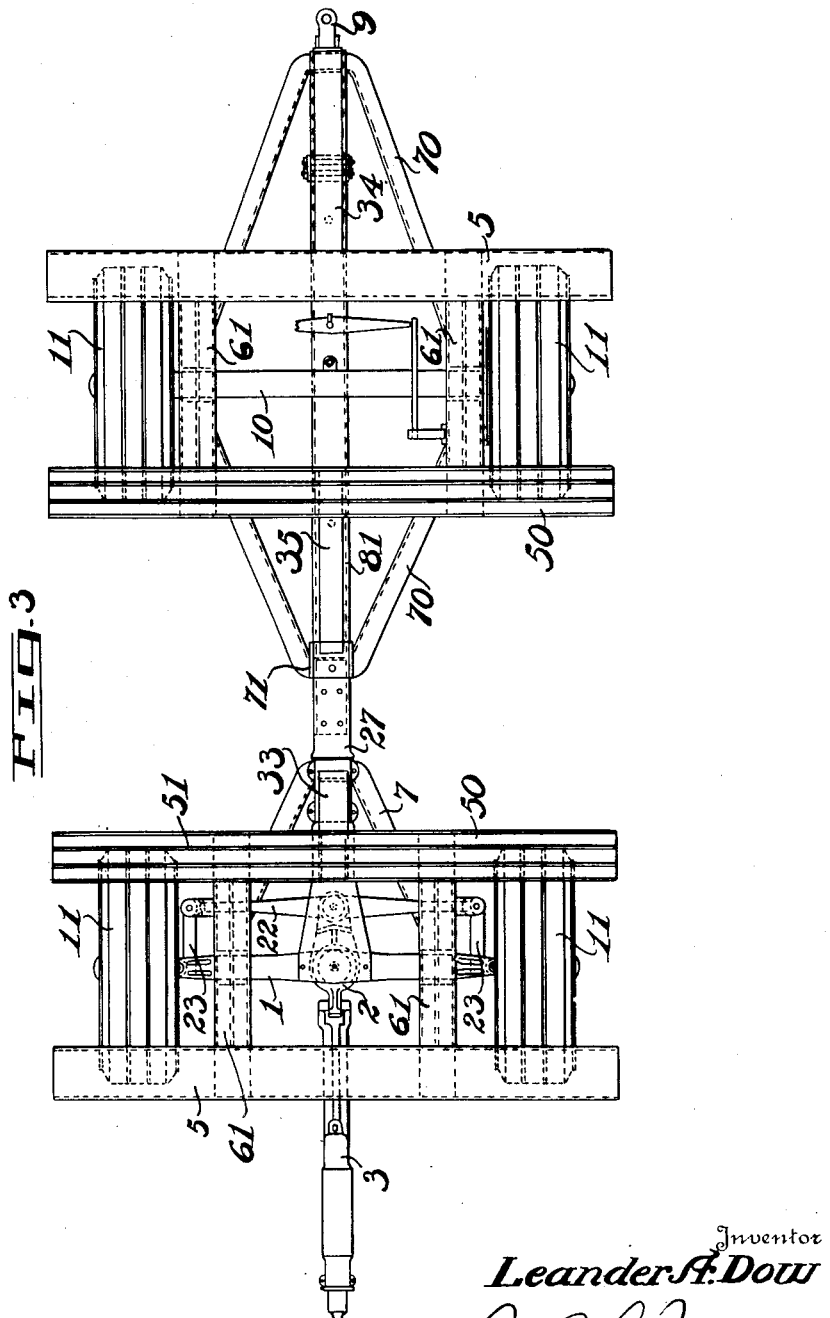

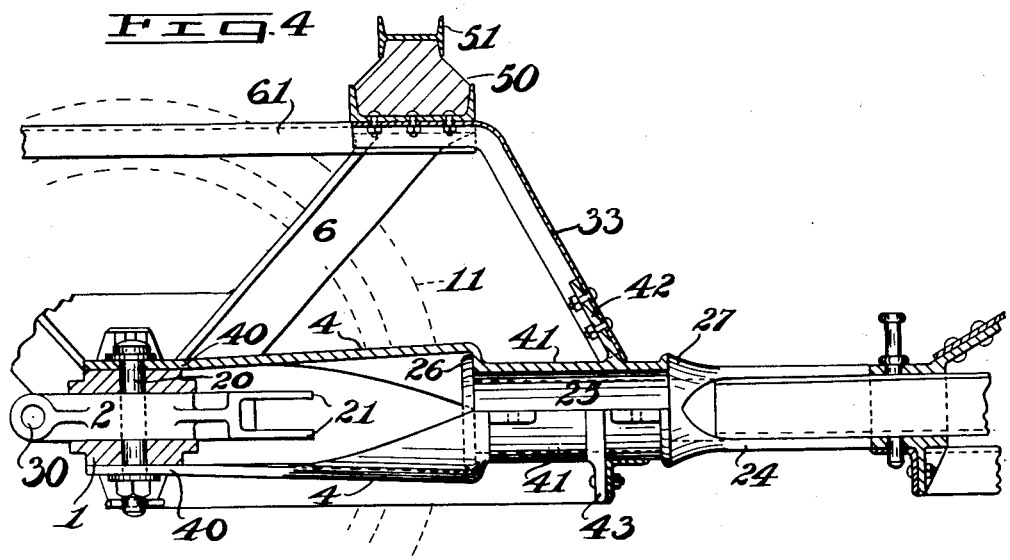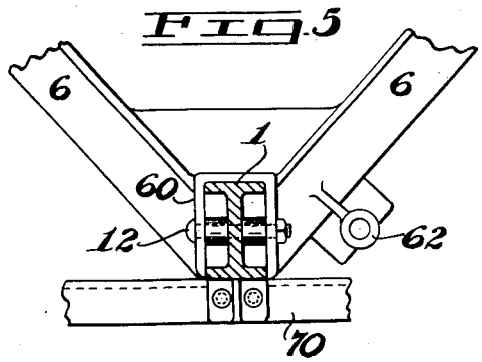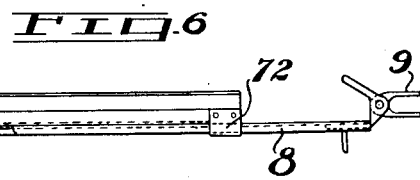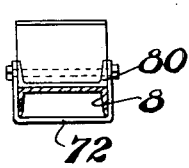

LEANDER A. DOW, OF SEATTLE, WASHINGTON, ASSIGNOR TO PACIFIC CAR & FOUNDRY CO., OF SEATTLE, WASHINGTON, A CORPORATION OF WASHINGTON.

TRAILER.

1,400,349.  Specification of Letters Patent.  Patented Dec. 13, 1921.

Application filed September 22, 1920. Serial No. 411,881.

*To all whom it may concern:*

Be it known that I, LEANDER A. Dow, a citizen of the United States of America, and resident of the city of Seattle, in the county of King and State of Washington, have invented certain new and useful Improvements in Trailers, of which the following is a specification.

My invention relates to trailers and consists of certain improvements in the construction of trailers which use two sets of axles and wheels and particularly to trailers of this kind which are equipped with bunks for the purpose of carrying logs and bulky products upon a platform which is above the upper level of the wheels.

The object of my invention is to improve and simplify the construction of such devices and in particular to construct a four-wheel trailer in such a manner that it will be capable of doing heavy work and of satisfactory operation over rough and soft ground.

The features of my invention which I believe to be new and upon which I desire to obtain a patent will be herein set forth and then particularly pointed out in the claims.

In the accompanying drawings I have shown a trailer constructed in accordance with my invention.

Figure 1 is a side elevation of the trailer.

Fig. 2 is a front elevation of the trailer.

Fig. 3 is a top or plan view.

Fig. 4 is a sectional elevation taken through the center of the length of the front axle, showing more particularly the steering mechanism and the swivel joint in the reach.

Fig. 5 is a cross section through one of the axles, showing the construction and manner of securing the V-shaped supporting frame upon the axle.

Fig. 6 is a side view and Fig. 7 a cross section of the reach.

In my present invention I employ two axles 1 and 10 having thereon wheels, as 11, forming a four-wheel trailer. The two axles are connected by a reach which is made adjustable in length and is also provided with a swivel joint or connection so that the front and rear portions thereof may have a turning movement about the axis of their length. In this manner the up and down movement of the wheels at opposite sides of the trailer may be different for the front and the rear axles, without undue straining of the connection between the two axles.

The front axle 1 is provided at the center of its length with an opening of such size as to accommodate the steering lever 2, which lever is pivoted by a king pin, as 20, which passes vertically through the upper and lower webs of the axle and the steering lever 2. At its rear end this steering lever 2 is provided with ears or flanges 21, between which is secured the steering bar 22 which is connected at its ends with the steering arms 23 of the knuckle joints. The forward end of the steering lever 2 has connected therewith the draft bar 3, by a pivot 30 which extends horizontally and parallel with the axle, whereby the draft bar may swing in a vertical plane in a manner similar to the tongue of an ordinary wagon.

One portion of the swivel joint is composed of two castings, 4, which at their forward ends consist of webs 40 one of which lies on the upper surface of the axle, and the other against the lower surface thereof. The king bolt 20, which secures the steering lever 2, also passes through these webs 40 and secures them to the axle. The rear end of these two members is composed of a semi-cylindrical sleeve 41, and these are secured together in such a way as to form a complete cylinder sleeve forming the outer member of the rotative part of a swivel joint. The upper one of the members 4 is also provided with an upwardly and forwardly extending flange 42 to which is secured a brace bar 33 which is connected with the lower portion of one of the bunks. The two bunks 5 and 50 extend transversely of the trailer at such an elevation as to have the upper surface well above the upper part of the wheels 11. One of these bunks, as 50, is preferably provided on its upper surface with a bar 51 having a flange which will engage logs being hauled. In case the trailer is not to be used for hauling logs but is to be provided with a platform for the reception of other freight, this bar 51 may be omitted.

The bunks are supported by frames 6 which are of V-shape with the lower apex formed into a yoke, as 60, which fits snugly over the axle 1. The two are secured together by bolts, as 12. Connecting the upper ends of the frame 6 is a beam 61, herein shown as a channel and upon the ends of which the bunks 5 and 50 are mounted.

The main construction of the frame mounted on the rear axle is like that of the front axle. It, however, varies in some minor details. The front axle has hounds 7 which are secured to the lower side of the axle by means of flanges forming a part of the axle, and are secured to a flange, as 43, which depends from the lower side of the lower half of the swivel member 41.

In connection with the rear axle, the hounds 70 are similarly secured to the rear axle 10 and at their front ends are provided with a bar 71 bent in such shape as to form a guide for the body of the reach. A brace bar 35 connects the forward end of the hounds, or the band 71 which is secured thereto, with the forward bunk 50. A similar brace rod 34 at the rear, connects the rear end of the hounds with the rear bunk. These bunks are supported upon V-shaped frames 6 similar to the manner of supporting the front set of bunks.

That part of the reach which is carried by the rear axle is made in two parts which are adjustable lengthwise of each other so as to vary the spacing between the front and the rear axles. One of these parts consists of a channel 8 which is secured to the rearwardly extending hounds 70 and to the brace bar 34. This channel extends to and is secured upon the rear axle 10. The other member consists of a channel 80 and a filler bar 81 which is guided at its forward end through the opening formed by the bar 71 and by a similar bar or clip 72 which is secured to its rear end and embraces the channel 8. The adjustable member 72 is secured in place by a pin, as 73, which passes through this and the guide member 71. The rear axle is provided with an opening at the center of its length and depth for the passage of the reach. The supporting frame 6, which is mounted upon the rear axle, is provided with a lug, as 62, upon which is mounted the brake operating shaft. At the rear end of the trailer frame a clevis 9 is provided, by which the draft rod 3 of another trailer may be connected if it be desired to use two or more trailers at the same time.

To the front end of the reach 2 is secured a casting 24 which has a cylindrical forward end 25 fitting within the sleeve 41. This is provided with shoulders, as 26 and 27, respectively, at the rear and forward ends of the sleeve 41, which take the pull and prevent disengagement. This swivel connection placed in the reach, permits free relative movement of the front and rear axles in vertical directions, without placing undue strain upon any part of the trailer.

What I claim as my invention is:

1. In a trailer, in combination, an axle, two triangular frames supported by an apex upon the axle, bunks connecting said frames, a draft member connected centrally with the axle and a brace extending from said draft member to one of the bunks, and a reach having a swiveling connection with said draft member.

2. In a trailer, in combination, an axle, two triangular supporting frames connected by an apex with the axle, bunks supported by said frames, hounds, a draft member secured to the axle and to the hounds, and a brace connecting the outer part of said draft member with one of the bunks.

3. In a trailer, in combination, an axle, two triangular supporting frames connected by an apex with the axle, bunks supported by said frames, hounds, a draft member secured to the axle and to the hounds, and a brace connecting the outer part of said draft member with one of the bunks, said draft member having a socket for the reception of the end of the reach to form a swivel connection.

4. In a trailer, in combination, a draft member having at one end separated sides adapted to span the axle, and at the other end a cylindrical sleeve, the later end also having a flange for the attachment of hounds and another flange for the attachment of a brace bar.

5. A draft connection for a two-axle trailer comprising a member having separated arms adapted to span the front axle and to receive a steering lever between them, said arms being joined rearwardly to form a cylindrical sleeve with its axis in alinement with the two axles, a reach connected with the rear axle and having a cylindrical forward end adapted to fit said sleeve and provided with projecting flanges at each end of the sleeve, thereby forming a swiveling draft connection.

6. In a trailer, in combination, an axle, hounds connected with the axle near the wheel journals and extending both forwardly and rearwardly, V-shaped load supporting yokes secured to the axle toward the outer ends thereof, tie beams connecting the upper ends of said yokes, fore-and-aft separated bunks connecting the tie beams, and braces connecting the outer end of each hound with the nearest bunk.

Signed at Seattle, King county, Washington, this 10th day of September, 1920.

LEANDER A. DOW.